United States Patent
Barton et al.

(10) Patent No.: US 7,586,206 B2
(45) Date of Patent: Sep. 8, 2009

(54) WIND TURBINE AND METHOD FOR OPERATING SAME

(75) Inventors: Werner Barton, Gescher (DE); Wilhelm Janssen, Saterland (DE); Robert Delmerico, Clifton Park, NY (US); Nicholas W. Miller, Delmar, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/346,248

(22) Filed: Dec. 30, 2008

(65) Prior Publication Data

US 2009/0108583 A1 Apr. 30, 2009

Related U.S. Application Data

(62) Division of application No. 11/238,473, filed on Sep. 29, 2005, now Pat. No. 7,504,738.

(51) Int. Cl.
*F03B 13/10* (2006.01)

(52) U.S. Cl. .............................. 290/44; 290/43; 290/54; 290/55

(58) Field of Classification Search .................. 290/43, 290/44, 54, 55
See application file for complete search history.

(56) References Cited

U.S. PATENT DOCUMENTS

| 4,461,957 | A | 7/1984 | Jallen |
| 4,994,684 | A | 2/1991 | Lauw et al. |
| 6,787,933 | B2 | 9/2004 | Claude et al. |
| 7,397,143 | B2 * | 7/2008 | Walling ........................ 290/44 |
| 7,411,309 | B2 * | 8/2008 | Hudson ........................ 290/44 |
| 7,432,686 | B2 * | 10/2008 | Erdman et al. ................ 322/44 |
| 2004/0119292 | A1 | 6/2004 | Datta et al. |
| 2005/0122083 | A1 | 6/2005 | Erdman et al. |
| 2005/0146141 | A1 | 7/2005 | Basteck |

* cited by examiner

*Primary Examiner*—Quyen Leung
*Assistant Examiner*—Iraj A Mohandesi
(74) *Attorney, Agent, or Firm*—James McGinness, Esq.; Armstrong Teasdale LLP

(57) ABSTRACT

A wind turbine includes an asynchronous generator having a rotor and a stator, means for determining an actual torque-speed curve of the generator, means for determining an actual grid frequency, and means for determining a shifted torque-speed curve in response to the determined actual grid frequency if the determined actual grid frequency is higher than a predetermined upper frequency limit or lower than a predetermined lower frequency limit. The means for determining a shifted torque-speed curve is further adapted to determine the shifted torque-speed curve such that an increase in the rotor voltage of said generator rotor is counteracted when shifting the actual torque-speed curve to the shifted torque-speed curve. The wind turbine further includes means for shifting the actual torque-speed curve of the generator to the shifted torque-speed curve.

8 Claims, 4 Drawing Sheets

WIND TURBINE AND METHOD FOR OPERATING SAME

CROSS REFERENCE TO RELATED APPLICATIONS

This patent application is a divisional application of U.S. patent application Ser. No. 11/238,473 filed on Sep. 29, 2005 now U.S. Pat. No. 7,504,738, which is hereby incorporated by reference in its entirety.

BACKGROUND OF THE INVENTION

The present invention relates to a wind turbine with frequency ride through capability and a method for operating such a wind turbine.

Wind power plants may be subject to fluctuations of the availability of primary energy due to wind gusts. For this reason, variable speed generators may be used for generating electric power by means of wind power plants because, when using such generators, the energy of wind gusts may not be immediately supplied to the grid but can be stored in the centrifugal masses of the wind power plant by variation of rotational speed. In this manner, the mechanical loads on the wind power plant may be substantially reduced compared to plants with fixed rotational speed, and the mechanical parts may possibly be designed and manufactured lightweight and with reduced costs. Induction generators are sometimes used as variable speed generators, wherein their stator coils are directly coupled to the voltage grid and their rotor windings are driven by the rotor of the wind power plant and are supplied with rotor currents by means of suitable converters. Therein, the frequencies of the supplied rotor currents are controlled in a manner that the sum of the rotor rotational frequency and the rotor current frequency is permanently equal to the grid frequency. For feeding the rotor windings, direct converters coupled to the grid as well as intermediate voltage circuit converters with a grid-sided converter and a rotor power converter coupled thereto via an inductive and/or capacitive reactance can be used.

However, the converters used in the rotor circuit may have certain limitations as to maximum rotor current and/or maximum rotor voltage. For example, a converter sometimes used in the rotor circuit of a wind turbine is an IGBT module in the 1700V voltage class. Such an IGBT module allows a maximum AC rotor voltage of 750 V to 770 V. Furthermore, the IGBT's limitation on the maximum rotor current may require a minimum slip and a minimum rotor voltage. If these limitations are not obeyed, the rotor currents may become too high for the IGBT converters in the rotor circuit and may, therefore, damage the converters.

Wind turbines may be designed for operation under "normal" conditions, i.e. for operation under nominal grid voltage and nominal grid frequency, and may have to fulfill simultaneously several boundary conditions. For example, the rotor voltage $U_r$ depends on the grid voltage $U_g$ and on the generator slip s. The slip s, in turn, depends on the grid frequency $f_g$ and on the generator rotor speed $n_{mech}$. Particularly, the slip s is proportional to the grid frequency $f_g$ in the overexcited range and reciprocally proportional in the under excited range. Especially, the maximum dynamic speed range, the nominal speed point $n_{nom}$ and the maximum allowable rotor voltage $U_r$ may be designed under the assumption of "normal" grid conditions, i.e. for nominal grid frequency ($f_g$=50 Hz in Europe, $f_g$=60 Hz in USA and parts of Japan) and nominal grid voltage $U_g$. Therefore, the simultaneous occurrence of several abnormal operating conditions can lead to a shut-down of the wind turbine, especially during gusty wind conditions, due to exceedingly high rotor currents.

One known ride-through strategy for such abnormal operating conditions where exceedingly high or low grid frequencies may occur is to adjust the power factor to a more inductive range. However, this strategy can possibly only be applied within a relatively narrow range of frequency transients. Particularly, adjusting the power factor to the more inductive range may lower the grid voltage $U_g$. Therefore, this strategy may be undesirable in cases of under voltage where further lowering of the voltage may not be allowed.

BRIEF DESCRIPTION OF THE INVENTION

In one aspect, a wind turbine includes an asynchronous generator having a rotor and a stator, means for determining an actual torque-speed curve of the generator, means for determining an actual grid frequency, and means for determining a shifted torque-speed curve in response to the determined actual grid frequency if the determined actual grid frequency is higher than a predetermined upper frequency limit or lower than a predetermined lower frequency limit. The means for determining a shifted torque-speed curve is further adapted to determine the shifted torque-speed curve such that an increase in the rotor voltage of said generator rotor is counteracted when shifting the actual torque-speed curve to the shifted torque-speed curve. The wind turbine further includes means for shifting the actual torque-speed curve of the generator to the shifted torque-speed curve.

In another aspect, a method is provided for operating a wind turbine. The method includes the steps of (a) determining an actual torque-speed curve of a generator of the wind turbine, (b) determining an actual grid frequency, (c) determining a shifted torque-speed curve in response to the determined actual grid frequency if the determined actual grid frequency is higher than a predetermined upper frequency limit or lower than a predetermined lower frequency limit, wherein the shifted torque-speed curve is determined such that an increase in the rotor voltage of the generator rotor is counteracted when shifting the actual torque-speed curve to the shifted torque-speed curve, and (d) shifting the actual torque-speed curve of the generator to the shifted torque-speed curve determined in step (c).

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that embodiments (whether described or illustrated herein) of the present invention include such modifications and variations.

Various embodiments of the present invention provide technical effects that include effectively lowering generator rotor voltage by shifting a torque-speed curve so that the increase in rotor voltage is counteracted. Thus, shut-off by a converter in the rotor circuit is avoided for high or low grid frequencies and improved high/low frequency ride through capability is provided. This control strategy is especially useful in grids having poor grid frequency stability. The shifting of the torque-speed curve can be easily implemented in a wind turbine, e.g. by providing a table of shift factors. The technical effects provided by various embodiments of the present invention also include a combination of power factor shifting and the torque-speed curve shifting so that ride-through capability for an even wider range of frequency transients is provided. Furthermore, the power loss can be compensated by combining the shift of the torque-speed curve with the shift of the power factor. Moreover, the technical effects provided by various embodiments of the present invention include a centralized control allowing central control of the wind farm influence on the grid. Simultaneously, the individual wind turbines can be individually controlled taking into account the specific conditions of each wind turbine.

Figure 1:
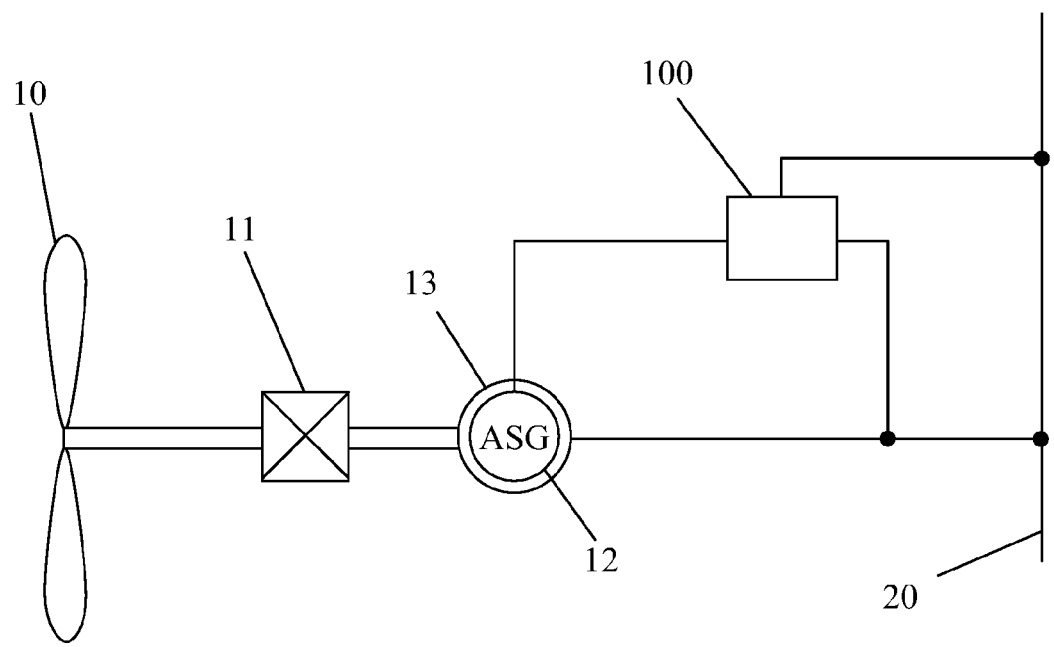
FIG. 1 is a schematic view of a wind turbine according to an embodiment of the present invention.

FIG. 1 is a schematic view of a wind turbine according to an embodiment of the present invention. The wind turbine comprises a rotor 10 coupled to a gear box 11. The gear box 11 is coupled to the rotor 12 of an asynchronous generator (ASG). The stator windings of the ASG are coupled to a grid 20. The rotor current is provided by grid 20 via a rotor circuit. A control means 100 is comprised in the rotor circuit. Control means 100 is connected with the grid so that it can detect an actual value of the grid frequency $f_g$. The control means 100 is adapted to shift a torque-speed curve of the ASG.

Figure 5:
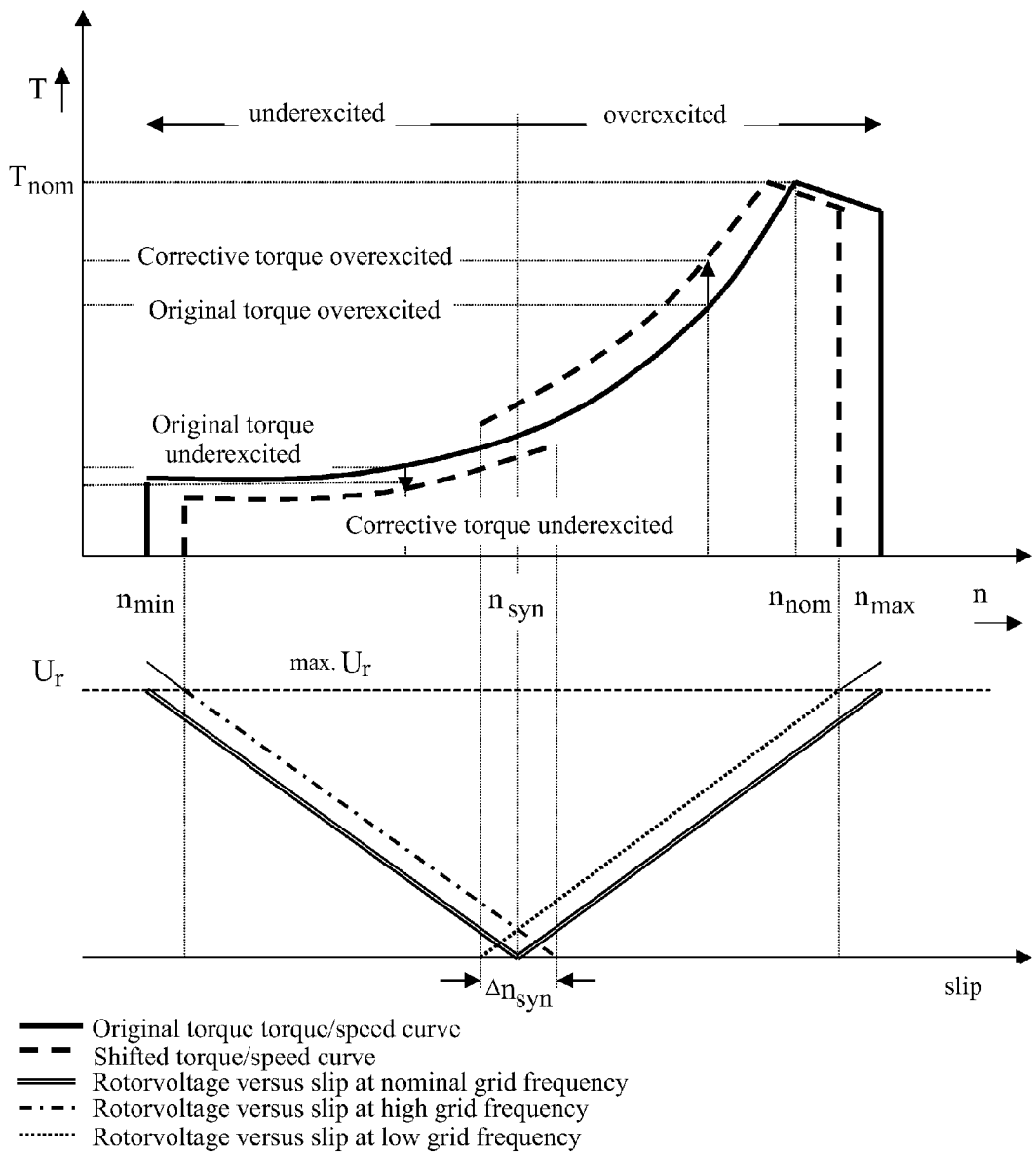
FIG. 5 is a diagram of torque-speed curves of wind turbines according to embodiments of the present invention.

A characteristic torque-speed curve of the ASG of a wind turbine is shown as a full curve in the upper part of FIG. 5. Therein, the torque-speed curve can be divided basically in two sections, the under excited range extending from the minimum speed $n_{min}$ to the synchronous speed $n_{syn}$, and the overexcited range extending from the synchronous speed $n_{syn}$ to the maximum speed $n_{max}$. Sometimes, the wind turbine control attempts to operate the generator at a nominal speed $n_{nom}$ near the peak of the curve as shown in FIG. 5. Furthermore, it is shown in FIG. 5 that the synchronous speed $n_{syn}$ may vary within a predetermined range $\Delta n_{syn}$ due to fluctuations of the grid frequency $f_g$.

Below the torque-speed curve in FIG. 5, the rotor voltage $U_r$ is shown as a function of the slip s. As is well-known, the rotor voltage $U_r$ increases with increasing difference between the mechanical speed $n_{mech}$ of the rotor and the synchronous speed $n_{syn}$. As mentioned before, the slip s depends on the grid frequency $f_g$ in that slip s is reciprocally proportional to the grid frequency $f_g$ in the under excited range and proportional to the grid frequency $f_g$ in the overexcited range. Therefore, an increase of $f_g$ leads to a decrease of s and, in turn, to an increase of $U_r$ in the under excited range. On the other hand, a decrease of $f_g$ leads to an increase of s and, in turn, to an increase of $U_r$ in the overexcited range. However, an excessive increase in $U_r$ may result in a damage of the converter as described in the introduction.

To avoid damage of the converter, the wind turbine according to the present embodiment of the invention is equipped with control means 100. Control means 100 is adapted to determine a shifted torque-speed curve (dashed line in FIG. 5). The shifted torque-speed curve is selected such that an increase in the rotor voltage $U_r$ is counteracted when shifting the actual torque-speed curve of the wind turbine (full line in FIG. 5) to the shifted torque-speed curve (dashed line in FIG. 5). For this purpose, the wind turbine according to the present embodiment comprises means for shifting the actual torque-speed curve of the generator to the shifted torque-speed curve.

Figure 2:
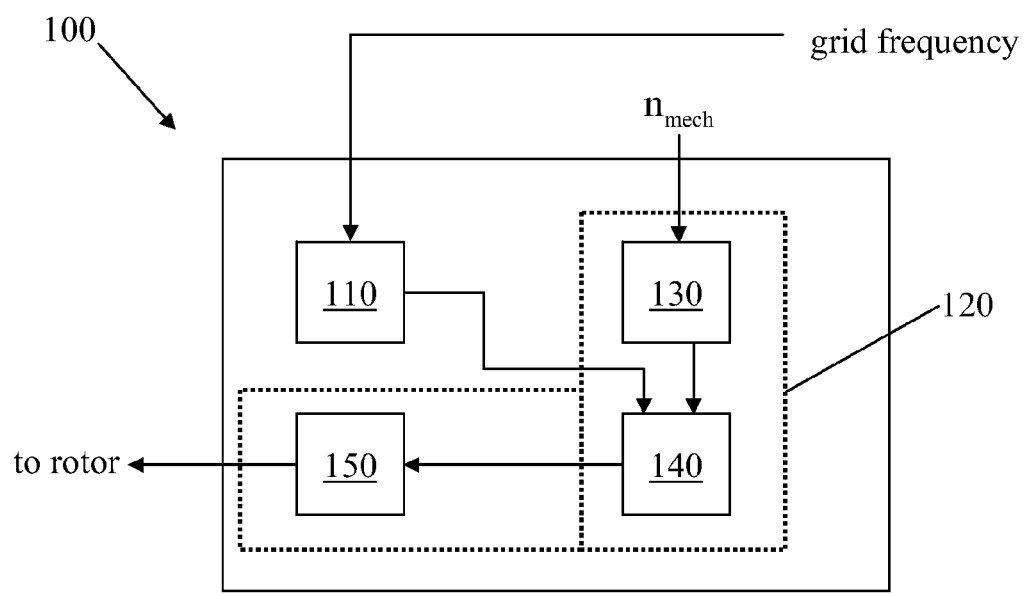
FIG. 2 is a schematic view of a control means used in the embodiment shown in FIG. 1.

Next, the design and operation of control means 100 for shifting the torque-speed curve is described in more detail with reference to FIG. 2. The control means 100 comprises a means 110 for determining the actual grid frequency $f_g$. Sometimes, the means 110 is a grid monitor system (GMS) which monitors the grid frequency $f_g$. Furthermore, control means 100 comprises means 130 for determining an actual torque-speed curve of the generator. The means 130 for determining an actual torque-speed curve receive the actual mechanical speed $n_{mech}$ of the generator rotor to calculate the actual torque-speed curve. Both, the GMS 110 and the means 130 provide their data to a means 140 for determining a shifted torque-speed curve. As long as the determined actual grid frequency $f_g$ stays within a predetermined grid frequency range, the rotor voltage $U_r$ will not exceed its maximum value and the means 140 will not provide a shifted torque-speed curve.

However, when the actual grid frequency provided by GMS 110 is higher than a predetermined upper frequency limit or lower than a predetermined lower frequency limit, a shifted torque-speed curve for the generator is determined. The shifted torque-speed curve is selected such that an increase in the rotor voltage $U_r$ is counteracted. Sometimes, the shifted torque-speed curve will be determined to reduce the slip s and, thus, reduce the rotor voltage $U_r$. Accordingly, in the under excited range the torque-speed curve will be shifted such that the actual torque corresponds to a higher speed or, in other words, the actual speed corresponds to a lower torque. As a result, the generator speed will increase due to the reduced load and the slip $s=(n_{mech}-n_{syn})/n_{syn}$ will decrease. Thus, the increase in rotor voltage $U_r$ is counteracted. On the other hand, in the overexcited range the torque-speed curve will be shifted such that the actual torque corresponds to a lower speed or, in other words, the actual speed corresponds to a higher torque. As a result, the generator speed will decrease due to the increased load and the slip $s=(n_{mech}-n_{syn})/n_{syn}$ will decrease. Thus, the increase in rotor voltage $U_r$ is counteracted.

Furthermore, the control means 100 comprises means 150 for shifting the actual torque-speed curve of the generator to the shifted torque-speed curve, e.g. by setting new parameters or the like. Sometimes, the means 130 for determining an actual torque-speed curve, the means 140 for determining a shifted torque-speed curve, and the means 150 for shifting the actual torque-speed curve are comprised in a wind turbine controller 120 (shown by dotted lines). However, these means may also be provided as separate components.

A wind turbine equipped with an above-described control means 100 has improved ride-through capability for high or low frequency transients. By shifting the torque-speed curve, the rotor voltage $U_r$ may be effectively reduced so that over voltages in the rotor circuit are avoided and a shutoff by the converter is prevented.

Figure 3:
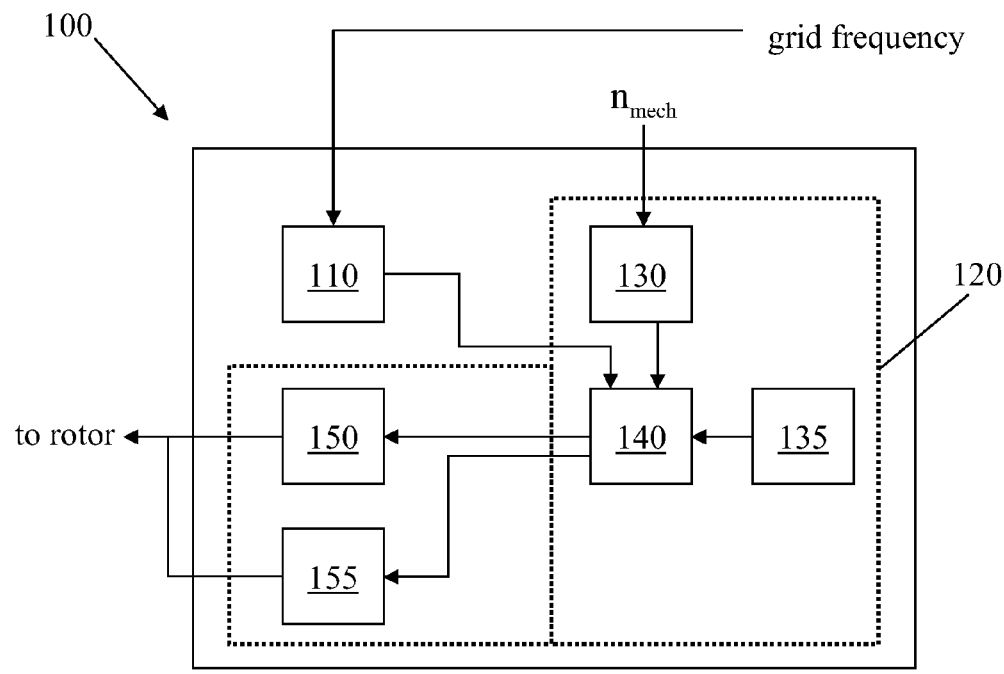
FIG. 3 is a schematic view of a control means according to a further embodiment of the present invention.

A further embodiment of a control means is now described with reference to FIG. 3. Therein, the control means has the same basic design as the one shown in FIG. 2. Additionally, means 135 for determining an actual generator power factor are provided, said means 135 providing the actual power factor to means 140 for determining a shifted generator power factor. Sometimes, the means for determining a shifted generator power factor and the means for determining a shifted torque-speed curve are integrated in a single component like a microprocessor. However, they may also be provided as separate components. The means 140 determines the shifted generator power factor in response to the measured current grid frequency. As long as the determined actual grid frequency stays within a predetermined grid frequency range, the means 140 does not provide a shifted generator power factor. However, when the actual grid frequency provided by GMS 110 is higher than a predetermined upper frequency limit or lower than a predetermined lower frequency limit, a shifted generator power factor is determined. The shifted generator power factor is selected such that it is more in the inductive range than the actual power factor. This does not depend on whether the generator operates in the overexcited or under excited range. Finally, the control means 100 comprises means 155 for shifting the actual generator power factor to the shifted generator power factor, e.g. by setting new parameters or the like. The means 155 for shifting the power factor and the means 150 for shifting the torque-speed curve may be integrally formed as a single component, e.g. a converter or inverter. Sometimes, the means 135 for determining an actual generator power factor and the means for determining a shifted generator power factor are integrated into a wind turbine controller 120 (shown by dotted lines). However, these means may also be provided as separate components.

Thus, the effect of shifting the torque-speed curve can be combined with the effect of shifting the power factor. Thereby, ride-through capability is provided for an even larger frequency range. Furthermore, power losses can be compensated by combining the shift of the torque-speed curve with the shift of the power factor.

Figure 4:
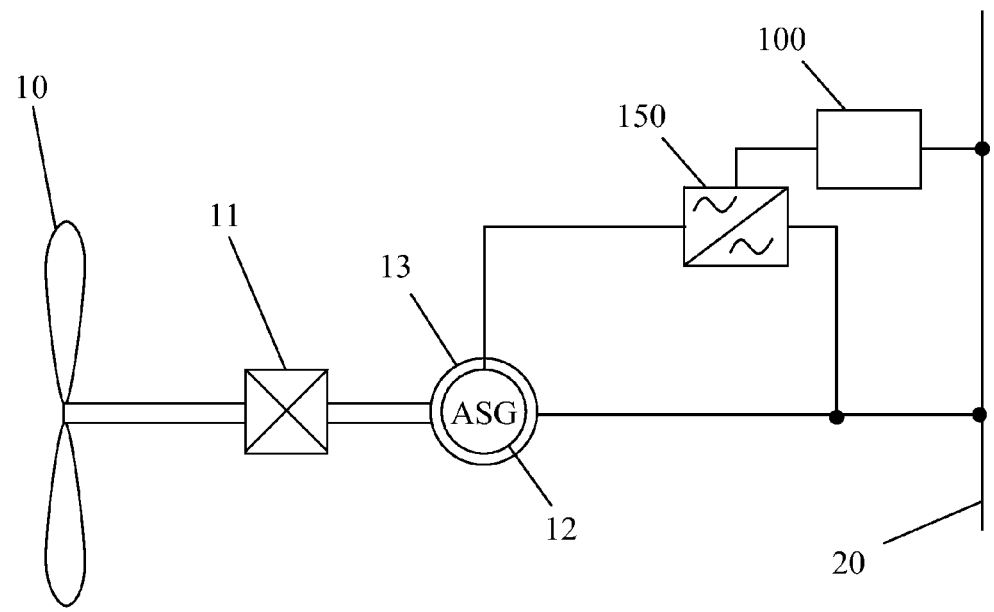
FIG. 4 is a schematic view of a wind turbine according to an embodiment of the present invention.

Next, a specific embodiment of a wind turbine is described with reference to FIG. 4. FIG. 4 shows a wind turbine with a double-feed intermediate rotor circuit. The rotor circuit comprises an inverter 150 which. The inverter 150 is controlled by a control means 100 which is also connected to the grid 20 for determining the actual value of the grid frequency $f_g$. When the actual value of the grid frequency $f_g$ is higher than an upper frequency limit or lower than a lower frequency limit, control means 100 controls inverter 150 so that inverter 150 applies a specific rotor current to rotor 12 to shift the torque-speed curve. The rotor current is adjusted such that the desired torque according to the shifted torque-speed curve is applied to the generator. A corresponding shifted torque-speed curve is shown in FIG. 5 as a dashed line. Alternatively, the rotor current can be varied by varying the resistance of the generator rotor, e.g. by variable resistors connected to the rotor windings.

Next, a method for operating a wind turbine according to another embodiment of the present invention is described. According to this method, an actual torque-speed curve of the generator and also an actual grid frequency are determined. If the determined actual grid frequency is higher than a predetermined upper frequency limit or lower than a predetermined lower frequency limit, a shifted torque-speed curve is determined. The specific shape of the shifted torque-speed curve depends on the actual value of the grid frequency and is also determined by the design parameters of the wind turbine. However, the shifted torque-speed curve is selected such that an increase in the rotor voltage $U_r$ is counteracted when shifting the actual torque-speed curve of the wind turbine to the shifted torque-speed curve. Sometimes, the shifted torque-speed curve will be determined to reduce the slip s and, thus, reduce the rotor voltage $U_r$. Accordingly, in the under excited range the torque-speed curve will be shifted such that the actual torque corresponds to a higher speed or, in other words, the actual speed corresponds to a lower torque. As a result, the generator speed will increase due to the reduced load and the slip $s=(n_{mech}-n_{syn})/n_{syn}$ will decrease. Thus, the increase in rotor voltage $U_r$ is counteracted. On the other hand, in the overexcited range the torque-speed curve will be shifted such that the actual torque corresponds to a lower speed or, in other words, the actual speed corresponds to a higher torque. As a result, the generator speed will decrease due to the increased load and the slip $s=(n_{mech}-n_{syn})/n_{syn}$ will decrease. Thus, the increase in rotor voltage $U_r$ is counteracted.

According to a further embodiment, the slip is reduced for the shifted torque-speed curve if the determined actual grid frequency is higher than a predetermined upper frequency limit. In a case where the determined actual grid frequency is lower than a predetermined lower frequency limit, the power-slip relationship is maintained for the shifted torque-speed curve.

The above control strategies can be further improved by additionally determining an actual generator power factor. If the determined actual grid frequency is higher than a predetermined upper frequency limit or lower than a predetermined lower frequency limit, a shifted power factor value is determined. The specific value of the shifted power factor depends on the actual value of the grid frequency and is also determined by the design parameters of the wind turbine. However, the power factor will be shifted towards positive values, i.e. towards the more inductive range.

Figure 6:
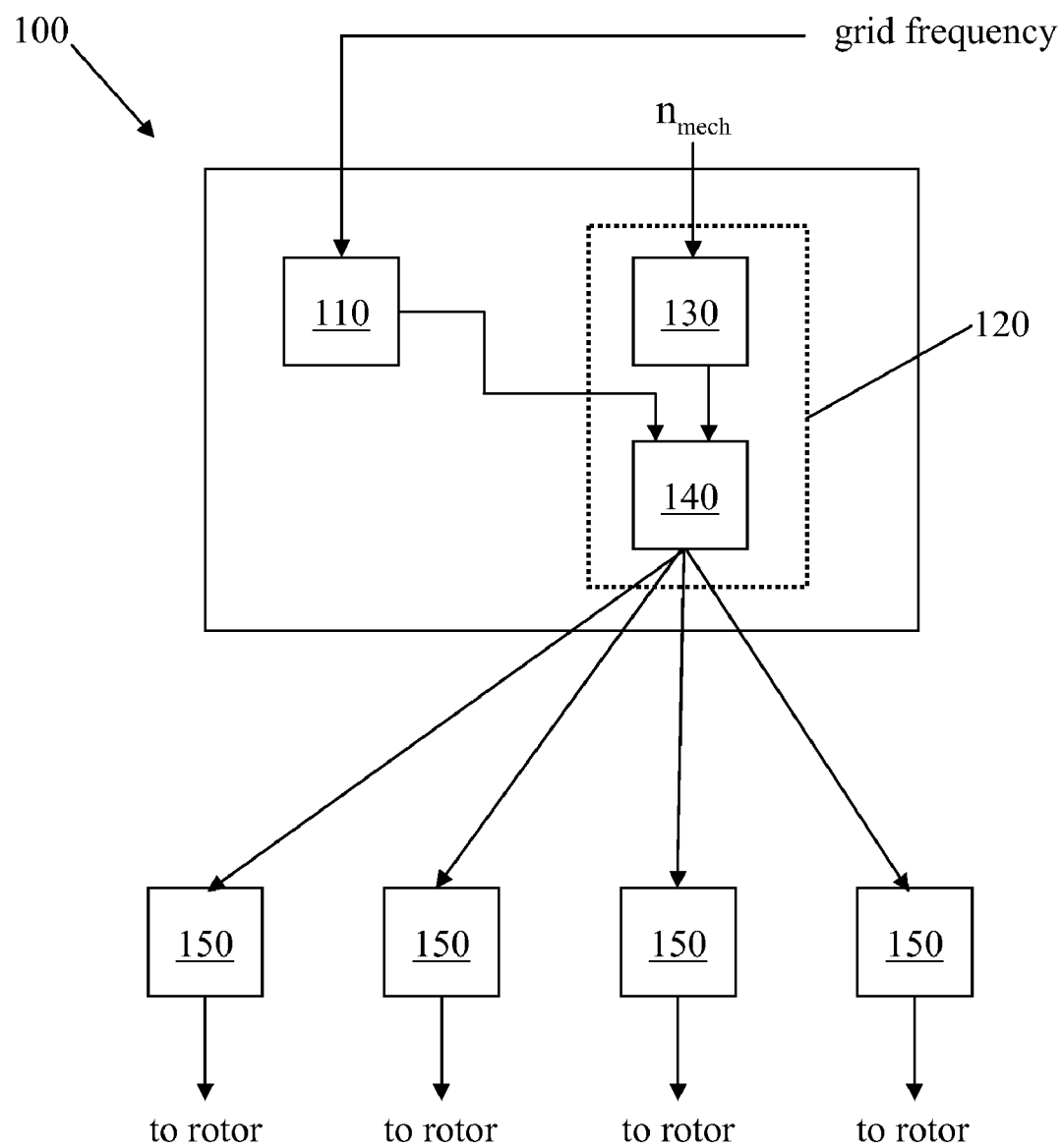
FIG. 6 is a schematic view of a wind farm according to an embodiment of the present invention.

Finally, a further embodiment of the present invention relates to the control of wind farms and is shown in FIG. 6. Therein, the control means 100 is integrated in a centralized wind farm management system of a wind farm comprising four wind turbines. It should be understood that the number of four wind turbines is only exemplary in this context. Each of the four wind turbines has means 150 for shifting the torque-speed curves of the respective wind turbine. These means 150 for shifting the torque-speed curve are connected to the means 140 for determining the shifted torque-speed curve in the centralized control. Thus, the centralized wind farm management system can individually adjust the torque-speed curves of each wind turbine of the wind farm taking into account general wind farm management requirements.

Exemplary embodiments of the present invention are described and/or illustrated herein in detail. The embodiments of the present invention are not limited to the specific embodiments described herein, but rather, components and steps of each embodiment may be utilized independently and separately from other components and steps described herein. Each embodiment component and step can also be used in combination with other embodiment's components and/or steps.

When introducing elements/components/steps/etc. of the embodiments of the present invention described and/or illustrated herein, the articles "a", "an", "the" and "said" are intended to mean that there are one or more of the element(s)/component(s)/steps/etc. The terms "comprising", "including" and "having" are intended to be inclusive and mean that there may be additional element(s)/component(s)/etc. other than the listed element(s)/component(s)/etc.

While the embodiments of the present invention described herein have been described and/or illustrated in terms of various specific embodiments, those skilled in the art will recognize that the embodiments described and/or illustrated herein can be practiced with modification within the spirit and scope of the claims.

What is claimed is:

1. A method for operating a wind turbine, said method comprising the steps of:
   (a) determining an actual torque-speed curve of a generator of the wind turbine;
   (b) determining an actual grid frequency;
   (c) determining a shifted torque-speed curve in response to the determined actual grid frequency if the determined actual grid frequency is higher than a predetermined upper frequency limit or lower than a predetermined lower frequency limit, wherein the shifted torque-speed curve is determined such that an increase in the rotor voltage of the generator rotor is counteracted when shifting the actual torque-speed curve to the shifted torque-speed curve; and
   (d) shifting the actual torque-speed curve of the generator to the shifted torque-speed curve determined in step (c).

2. The method according to claim 1 wherein, in the underexcited range, a shifted torque-speed curve assigning a higher speed to the same torque as compared to the actual torque-speed curve is determined in step (c), and, in the overexcited range, a shifted torque-speed curve assigning a lower speed to the same torque as compared to the actual torque-speed curve is determined in step (c).

3. The method according to claim 1 wherein the slip is reduced for the shifted torque-speed curve if the determined actual grid frequency is higher than a predetermined upper frequency limit.

4. The method according to claim 1 wherein the power-slip relationship is maintained for the shifted torque-speed curve if the determined actual grid frequency is lower than a predetermined lower frequency limit.

5. The method according to claim 1 wherein the actual torque-speed curve is shifted by varying the rotor current.

6. The method according to claim 5 wherein the rotor current is varied by a converter connected to the rotor windings.

7. The method according to claim 5 wherein the rotor current is varied by varying the resistance of the rotor.

8. The method according to claim 1 further comprising the steps of:
   (e) determining an actual generator power factor;
   (f) determining a shifted generator power factor in response to the determined actual grid frequency if the determined actual grid frequency is higher than a predetermined upper frequency limit or lower than a predetermined lower frequency limit, wherein the shifted generator power factor is more in the inductive range than the actual power factor; and
   (g) shifting the actual generator power factor to the shifted generator power factor.

* * * * *